Sept. 22, 1970   E. PFAFFENBERGER   3,529,897
INDICATING MECHANISM FOR ZERO-CURRENT INSTRUMENTS
Filed Dec. 29, 1967

INVENTOR
ERWIN PFAFFENBERGER
BY Nolte & Nolte
ATTORNEYS

United States Patent Office 3,529,897
Patented Sept. 22, 1970

3,529,897
INDICATING MECHANISM FOR ZERO-CURRENT INSTRUMENTS
Erwin Pfaffenberger, Erlangen, Germany, assignor to P. Gossen & Co. G.m.b.H., Erlangen, Germany
Filed Dec. 29, 1967, Ser. No. 694,453
Claims priority, application Germany, June 16, 1967, G 50,397
Int. Cl. G01j 1/42; G01r 31/00, 13/38
U.S. Cl. 356—227   5 Claims

ABSTRACT OF THE DISCLOSURE

In a photoelectric exposure meter a masking vane is carried by the moving element. A light source produces a beam which is guided to an observation point. The masking vane interferes with the beam going to a pair of observation points according to the degree of deviation of the moving element from a balanced or zero position. No interference occurs when the moving element is in the balanced or zero position, therefore, in the latter position the observation points receives, equal illumination from the beam.

BACKGROUND OF THE INVENTION

Field of the invention

The present invention relates to an indicating mechanism for a metering device, and more particularly it relates to the indicating mechanism of a zero current device used in photoelectric exposure meters.

Description of the prior art

The types of meters to which the invention is applicable are generally constructed to indicate a predetermined balanced value which is attained when the pointer of the indicating mechanism settles on a mark associated with such balanced value.

A deviation from such mark in either direction indicates that the balanced value has not been attained yet or it has been already overshot. There are photoelectric exposure meters known which employ a vane in front of the light-sensitive element which vane is adjusted manually so that the pointer settles on a mark which is stationarily fixed with respect to the housing. In the above-mentioned meter types having the stationary mark fixed to the housing, in order to attain and retain the balanced or zero position and in order to accurately ascertain such position, the pointer must be made very thin and the fixed stationary reference mark must be also constructed with a fine point. Such construction of both elements is accompanied with various disadvantages, such as, the observation of the pointer and the mark can be performed from only a close distance, that is, one must bend over the instrument. Such meters, in addition, require generally good light conditions. On the other hand, exposure meters are used frequently under insufficient light conditions, since the importance of the exposure meters comes into play mostly under the last mentioned conditions. Farsighted individuals require eyeglasses to read the instrument, which might not be at all times on hand. Under such circumstances, balancing of the meter is difficult and inaccurate, if not impossible at all. Shortsighted individuals, on the other hand, may be forced to take off their eyeglasses in order to balance the meter, which manipulation along with the general apprehension of every individual against reading meter scales, will complicate the balancing operation.

SUMMARY OF THE INVENTION

It is, therefore, an object of the invention to provide a novel indicating mechanism for zero-current instruments which do not posses the above described disadvantages.

It is another object of the invention to provide a novel indicating mechanism for a photoelectric exposure meter in which the observation of the balanced or zero position does not require the observation of the settling of at least one mechanically movable pointer with respect to another.

It is a further object of the present invention to provide an indicating mechanism of the balanced or zero-current position in a photoelectric exposure meter, in which the balanced or zero current position can be observed by comparing different light intensities.

In accordance with the invention, the rotary element of the indicating mechanism of the zero-current instrument carries a masking vane which depending on its position interferes with a light beam going to two light elements, in such a manner, that the light elements under balanced or zero-current condition of the meter exhibit equal light intensities, while during a deviation from the balanced condition, the light elements exhibit different light intensities.

In accordance with the invention the balanced condition of the exposure meter becomes easily recognizable even from a greater distance and even under insufficient light conditions. Even individuals having different eye problems, can without difficulty, balance the meter irrespective of whether they keep their eyeglasses on or off, since the balancing operation requires only the observation of the light intensities of two light elements.

DESCRIPTION OF THE PREFERRED EMBODIMENTS

Figure 1:
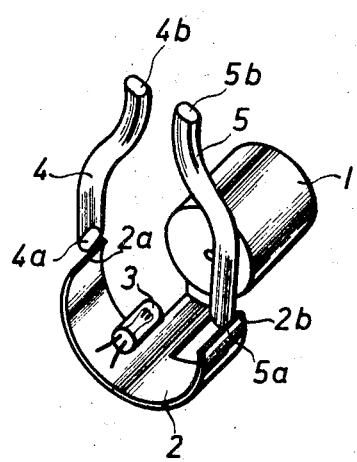
FIG. 1 is a perspective view of one embodiment of the invention showing only the movable element of the meter.

With reference to FIG. 1, the rotating portion of the movable element 1 of a meter carries a curvilinear masking vane 2 made from a non-light transparent material. The masking vane 2 as shown in FIG. 1 in the form of semi-circularly bent strip and in a position corresponding to the zero-current or balanced condition of the meter, moves in either direction in accordance with the deflection of the meter with respect to its balanced condition. Along the axis of the movable element 1, a light source, in the form of a fixed small bulb 3 is disposed and partly surrounded by the masking vane 2. A pair of bent light conductors 4 and 5 are disposed within the housing of the meter, the housing itself not being shown on the drawing. The light conductors having their respective inner ends 4a and 5a disposed adjacent to the respective edge portions of the masking vane 2 so that the masking vane does not interfere with the light from the bulb 3 and permits entry thereof in the shown balanced condition equally into both input apertures 4a and 5a. Input apertures 4a and 5a are formed to expose the largest possible cross-section to the light beam coming from bulb 3 in the indicated balanced condition. The light emitting output apertures 4b and 5b of the light conductors 4 and 5 are disposed closely adjacent to each other and lead to an upper portion of the meter housing for observation as hereinafter described.

The operation of the above described arrangement is as follows:

In the balanced condition, shown in FIG. 1, both light emitting outputs 4b and 5b glow with the same light intensity. Should the movable element 1 of the meter rotate in clockwise direction and carrying therewith masking vane 2 from its zero position, then the light entry aperture 4a of the light conductor 4 will be masked more and more by the edge 2a and subsequently by the surface of vane 2, should the rotation continue further clockwise. At the same time, light emitting aperture 4b becomes increasingly darker, while the other light emitting aperture 5b keeps emitting the same light intensity as before. Should the movable element 1 rotate in counter-clockwise direction, then the light emitting aperture 4b remains glowing with the same light intensity, while the light emitting aperture 5b becomes increasingly darker. Should the movable element 1 be required to rotate more than 180° then appropriate stops are provided so that edge portion 2a should not interfere with light entry aperture 5a, similarly, edge portion 2b should then not interfere with light entry aperture 4a.

The invention also provides that masking vane 2 could be made of a size which permits half way masking of both light entry apertures 4a and 5a in the balanced condition, whereupon rotation of the movable element 1 will cause a darkening of one of the light emitting apertures with a proportionally increasing illumination of the other.

Figure 2:
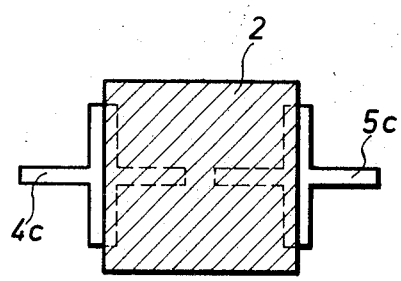
FIG. 2 is a plan view of another embodiment of the light elements in operational position with the masking vane.
Figure 3:
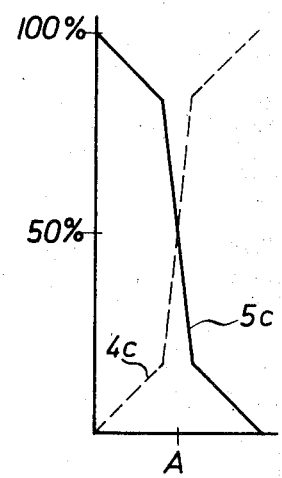
FIG. 3 is a schematic showing the light intensity relations at the zero-current position of the embodiment of FIG. 2.

It has been found that the balancing can be performed more accurately if the rate of change of the light intensity at the balancing point is the greatest. As shown in FIG. 2, the last mentioned objective can be accomplished by an appropriate formation of the cross section of the light conductors 4 and 5 or by appropriately shaping the masking edge portions 2a and 2b of the vane. The light conductors in FIG. 2, for example, are preferably made with a cross-like cross section 4c and 5c which, in the balanced condition, as shown in FIG. 2, symmetrically mask both of the light beams, that is the light beams are masked to one half of their extent. Under this condition, the light emitting apertures 4b and 5b produce a light intensity relation as shown in FIG. 3 from which it can be seen that the rate of change of intensity is greatest in the neighborhood of the balance point A. Since in the embodiment shown in FIG. 2 one of the light elements becomes darker while the other becoming proportionately lighter, the result will be a doubling of the intensity difference between the two light elements. Under such conditions, both light elements glow with the highest intensity at the balancing point and upon a deviation from the balance point in one direction, only the corresponding light element becomes darker while the other will glow with the same light intensity.

The novel device in accordance with the invention provides another advantage over the known zero-current instruments having pointer indicators in that the accuracy of the balancing point can be adjusted to any desired accuracy. Generally, a high accuracy is not desired since the balancing should be performed quickly and if the invention is used in connection with exposure meters, they are manually held during the balancing operation.

Figure 4:
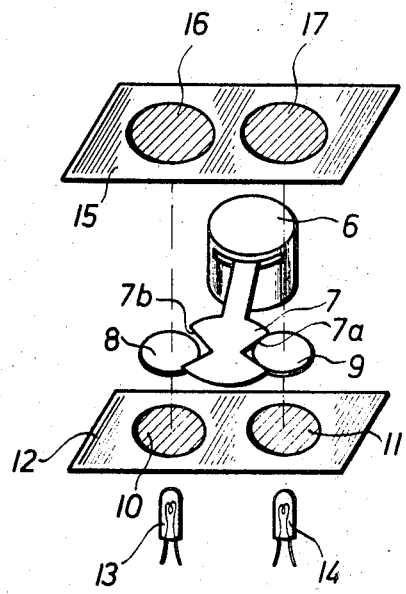
FIG. 4 is a perspective view of another embodiment of the light elements of the invention.

Another embodiment of the invention is shown in FIG. 4 in which the movable element 6 of the meter carries a fixedly secured vane 7 which is formed as a disk having recessed portions 7a and 7b therein. A pair of lenses 8 and 9 are disposed slightly below the path of movement of the vane 7 so that vane 7 can pass over them when the meter is deflected in either direction. Both lenses serve as image forming optics for a pair of light surfaces 10 and 11 which are formed from a light transparent material in the form of a disc disposed in a non-light transparent masking plate 12. The light source includes two bulbs 13 and 14, the light beam of which through elements 10 and 11 and through the optical lenses 8 and 9 forms a pair of images 16 and 17 on a translucent or smoked plate 15. The images 16 and 17 correspond to the light emitting apertures 4b and 5b in FIG. 1. In the indicated balanced condition of FIG. 4, both lenses 8 and 9 are uncovered by the vane 7 and permit the light beam of the bulbs to completely pass therethrough. Should the movable element 6 be deflected in either direction, one of the lenses will be masked to the extent of the deflection, while the other remains free and the light beam passes therethrough unobstructed.

It should be apparent to those skilled in the art that while a preferred embodiment of this invention has been shown and described in accordance with the patent statutes, it is to be understood that modifications can be made without actually departing from the true spirit and scope of this invention as defined in the following claims.

What is claimed is:

1. In an electric metering device including a moving element, an indicating system comprising light source means, a pair of light directing elements, said light source means comprising means for directing light beams of equal intensity to strike said pair of light directing elements when the moving element is in a balanced position, light blocking vane means carried by said moving element for varying the amount of light from said light source means which strikes at least one of said light-directing elements when the moving element is deflected from the balanced position so that a pair of light beams of unequal intensity from said source strike said pair of light directing elements whereby unequal intensity of light in said light directing elements provides an indication of deflection of said moving element from the balanced position and the vane means can be returned to the balanced position.

2. An electric metering device according to claim 1, further comprising means for varying the rate of change of the brightness intensity of at least one of said light beams between a first rate when said moving element is near the balancing point and a second substantially smaller rate when the moving element is far from the balancing point.

3. A photoelectric exposure meter responsive to the output from a light measuring photocell including a moving element, an indicating system comprising light source means, a pair of light directing elements, said light source means comprising means for directing light beams of equal intensity to strike said pair of light directing elements when the moving element is in a balanced position, said light directing elements being positioned to permit viewing of light directed thereby, light blocking vane means carried by said moving element for varying the amount of light from said light source means which strikes at least one of said light directing elements when the moving element is deflected from the balanced position so that a pair of light beams of unequal intensity strike the pair of light directing elements whereby a deflection of said moving element from the balanced position will be indicated.

4. A photoelectric exposure meter according to claim 3, wherein said light directing elements have cross sectional shapes whereby the rate of change of the brightness intensity of at least one of said light beams with movement of said moving element varies between a first rate when said moving element is near the balancing point and a second substantially smaller rate when the moving element is far from the balancing point.

5. The photoelectric exposure meter according to claim 3, wherein said light source means comprises a pair of light emitting elements said indicating system further comprises a pair of optic means and a pair of light transparent surfaces, said light directing means comprising:

a pair of translucent surfaces, said light emitting elements comprising means for directing light beams of equal intensity to said light transparent surfaces and said optic means comprising means for focusing said beams of light on said translucent surfaces.

References Cited

UNITED STATES PATENTS

| | | | |
|---|---|---|---|
| 2,102,753 | 12/1937 | Schwarz | 350—269 X |
| 2,134,982 | 11/1938 | Mock | 350—269 X |
| 2,206,400 | 7/1940 | Hasbrouck | 350—269 X |
| 2,850,942 | 9/1958 | Stevenson et al. | 353—41 |

FOREIGN PATENTS 237,295  11/1959  Australia.

RONALD L. WIBERT, Primary Examiner

W. A. SKLAR, Assistant Examiner

U.S. Cl. X.R.

324—96, 97; 350—266, 269, 273; 353—40